(12) United States Patent
Saleh et al.

(10) Patent No.: US 12,014,208 B2
(45) Date of Patent: Jun. 18, 2024

(54) TECHNIQUES FOR REDUCING SERIALIZATION IN DIVERGENT CONTROL FLOW

(71) Applicant: Advanced Micro Devices, Inc., Santa Clara, CA (US)

(72) Inventors: Skyler Jonathon Saleh, La Jolla, CA (US); Maxim V. Kazakov, La Jolla, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 701 days.

(21) Appl. No.: 16/023,897

(22) Filed: Jun. 29, 2018

(65) Prior Publication Data
US 2020/0004585 A1 Jan. 2, 2020

(51) Int. Cl.
| | |
|---|---|
| *G06F 9/46* | (2006.01) |
| *G06F 9/38* | (2018.01) |
| *G06F 9/48* | (2006.01) |
| *G06F 9/52* | (2006.01) |
| *G06T 15/00* | (2011.01) |
| *G06T 15/80* | (2011.01) |

(52) U.S. Cl.
CPC .......... *G06F 9/4881* (2013.01); *G06F 9/3887* (2013.01); *G06T 15/005* (2013.01); *G06T 15/80* (2013.01); *G06F 9/4843* (2013.01); *G06F 9/52* (2013.01)

(58) Field of Classification Search
CPC .... G06F 9/4881; G06F 9/3887; G06F 9/4843; G06F 9/52; G06T 15/005; G06T 15/80
See application file for complete search history.

(56) References Cited

U.S. PATENT DOCUMENTS

| | | | | |
|---|---|---|---|---|
| 5,894,576 A | * | 4/1999 | Bharadwaj | G06F 8/445 712/216 |
| 7,477,255 B1 | * | 1/2009 | Lindholm | G06T 15/005 345/501 |
| 8,787,154 B1 | * | 7/2014 | Medved | H04L 45/50 370/225 |

(Continued)

OTHER PUBLICATIONS

Ariovaldo Denis Granja; Improving workflow and resource usage in construction schedules through location-based management system (LBMS); Jan. 15, 2018.*

*Primary Examiner* — Michael W Ayers
(74) *Attorney, Agent, or Firm* — Volpe Koenig

(57) ABSTRACT

Techniques for executing shader programs with divergent control flow on a single instruction multiple data ("SIMD") processor are disclosed. These techniques includes detecting entry into a divergent section of a shader program and, for the work-items that enter the divergent section, placing a task entry into a task queue associated with the target of each work-item. The target is the destination, in code, of any particular work-item, and is also referred to as a code segment herein. The task queues store task entries for code segments generated by different (or the same) wavefronts. A command processor examines task lists and schedules wavefronts for execution by grouping together tasks in the same task list into wavefronts and launching those wavefronts. By grouping tasks from different wavefronts together for execution in the same front, serialization of execution is greatly reduced or eliminated.

20 Claims, 6 Drawing Sheets

(56) References Cited

U.S. PATENT DOCUMENTS

| | | | |
|---|---|---|---|
| 10,242,419 B2* | 3/2019 | Sathe | G06T 1/60 |
| 2003/0200427 A1* | 10/2003 | Kemp | G06F 9/4411 |
| | | | 713/1 |
| 2005/0108720 A1* | 5/2005 | Cervini | G06F 9/3851 |
| | | | 718/105 |
| 2006/0230252 A1* | 10/2006 | Dombrowski | G06F 12/1027 |
| | | | 711/205 |
| 2007/0038726 A1* | 2/2007 | Vaidya | G06F 16/958 |
| | | | 709/219 |
| 2009/0059910 A1* | 3/2009 | Rijpkema | H04L 45/38 |
| | | | 370/375 |
| 2009/0240931 A1* | 9/2009 | Coon | G06F 9/30054 |
| | | | 712/234 |
| 2013/0160017 A1* | 6/2013 | Hartog | G06F 9/5027 |
| | | | 718/103 |
| 2014/0149710 A1* | 5/2014 | Rogers | G06F 9/3887 |
| | | | 711/170 |
| 2014/0181467 A1* | 6/2014 | Rogers | G06F 9/3887 |
| | | | 712/22 |
| 2014/0330429 A1* | 11/2014 | Collombet | B65G 51/44 |
| | | | 700/226 |
| 2015/0124608 A1* | 5/2015 | Agarwal | H04L 47/122 |
| | | | 370/235 |
| 2016/0019066 A1* | 1/2016 | Diamos | G06F 9/3009 |
| | | | 712/228 |
| 2016/0239302 A1* | 8/2016 | Puthoor | G06F 9/3851 |
| 2016/0267621 A1* | 9/2016 | Liao | G06T 1/20 |

* cited by examiner

TECHNIQUES FOR REDUCING SERIALIZATION IN DIVERGENT CONTROL FLOW

BACKGROUND

On a single-instruction-multiple-data ("SIMD") or single-instruction-multiple-thread ("SIMT") processor, individual items of execution ("work-items") are grouped and executed together as wavefronts to take advantage of the parallel nature of these processors, according to which multiple work-items execute the same instruction in a respective lane of the wavefront with different data in the same clock cycle. Under some situations, it is possible for different work-items to have divergent control flow paths. For instance, if a conditional branch occurs that is conditional on data that differs between work-items, then some work-items may take the branch while others do not. Under such situations, the SIMD or SIMT machine can no longer be efficiently utilized, since it must execute different instructions for different work items in the wavefront. Since, divergent flow control is common in practice, improvements are constantly being made in the area of executing programs with divergent control flow on parallel SIMD and SIMT processors.

BRIEF DESCRIPTION OF THE DRAWINGS

A more detailed understanding may be had from the following description, given by way of example in conjunction with the accompanying drawings wherein.

DETAILED DESCRIPTION

A technique for executing shader programs with divergent control flow on a SIMD or SIMT processor is disclosed. On a single-instruction-multiple-data ("SIMD") or single-instruction-multiple-thread ("SIMT") processor, individual items of execution ("work-items") are grouped and executed together as wavefronts to take advantage of the parallel nature of these processors, according to which multiple work-items execute the same instruction in a respective lane of the wavefront with different data in the same clock cycle. Under some situations, it is possible for different work-items to have divergent control flow paths. For instance, if a conditional branch occurs that is conditional on data that differs between work-items, then some work-items may take the branch while others do not.

One technique to handle divergent control flow is to serialize each divergent path. Specifically, each possible control flow path is executed, with only the lanes corresponding to the work-items that take any particular control flow path enabled, and the other lanes disabled. This serialization represents a performance penalty, as the duration of the shader program is increased by a factor related to the degree of serialization. In certain situations, such as when each work-item executes a function pointer pointing to a different function, the high degree of serialization results in a large performance penalty.

A technique to reduce or eliminate this serialization is disclosed herein. This technique includes detecting entry into a divergent section of a shader program and, for the work-items that enter the divergent section, placing a task entry into a task queue associated with the target of each work-item. The target is the destination, in code, of any particular work-item, and is also referred to as a code segment herein. The task queues store task entries for code segments generated by different (or the same) wavefronts. A command processor examines task lists and schedules wavefronts for execution by grouping together tasks in the same task list into wavefronts and launching those wavefronts. By grouping similar tasks from different wavefronts together for execution in the same wavefront, serialization of execution is greatly reduced or eliminated.

Figure 1:
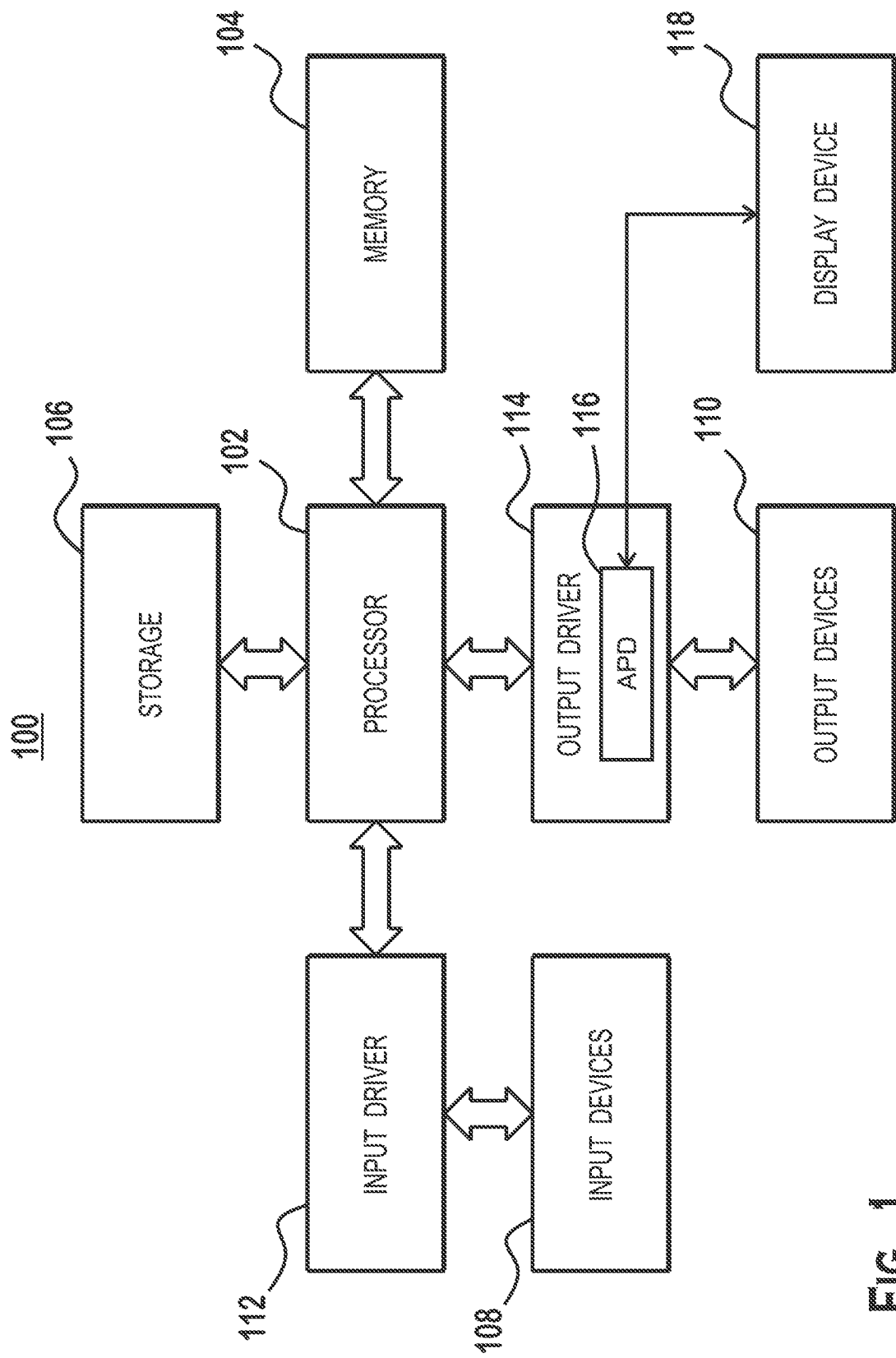
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display. The techniques described herein could also be performed by an AP 116 that does not have graphics rendering capability.

Figure 2:
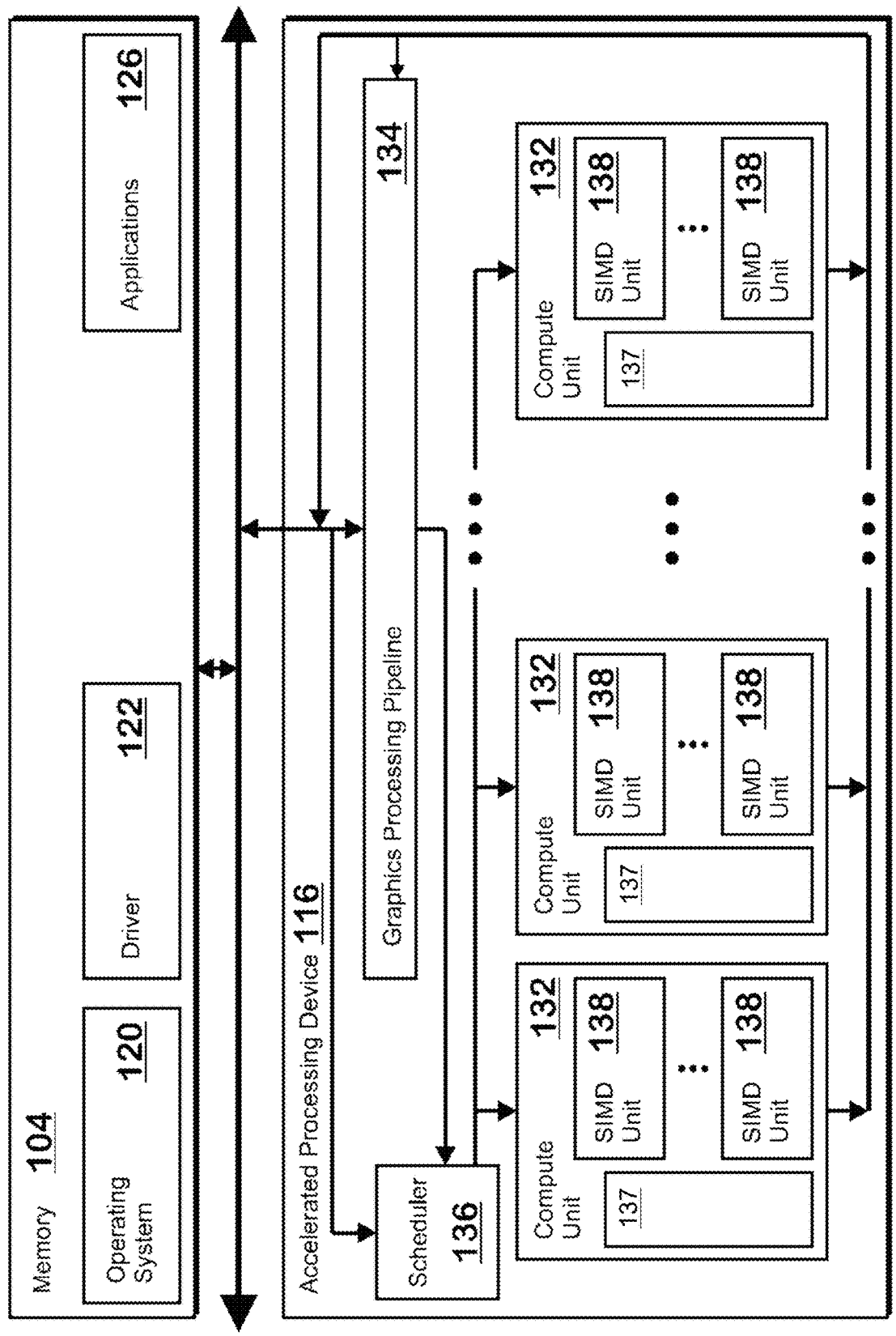
FIG. 2 is a block diagram of the device of FIG. 1, illustrating additional detail, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A command processor 137 is present in the compute units 132 and launches wavefronts based on work (e.g., execution tasks) that is waiting to be completed. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134.

Execution of a shader program may lead to control flow that is divergent. More specifically, the SIMD units 138 of the APD 116 execute a shader program in a SIMD manner, in which instructions of the shader program are executed for multiple work-items simultaneously. A single control flow unit fetches and executes instructions, and the instructions are executed for multiple different items of data associated with the different work-items. Divergent control flow occurs when an instruction that modifies control flow is executed for multiple work-items simultaneously, but the target for the instruction is different for at least two of those work-items. The two work-items would then be redirected to two different locations in the shader, which would mean that the work-items could not be executed simultaneously in a SIMD manner. In one example, a conditional branch is executed that branches if a particular variable is less than 0. Multiple work-items execute this branch simultaneously, according to the SIMD paradigm, but because the conditional branch is based on the value of the variable, which can be different for the different work-items, some of the work-items take the branch and other work-items do not take the branch.

Figure 3:
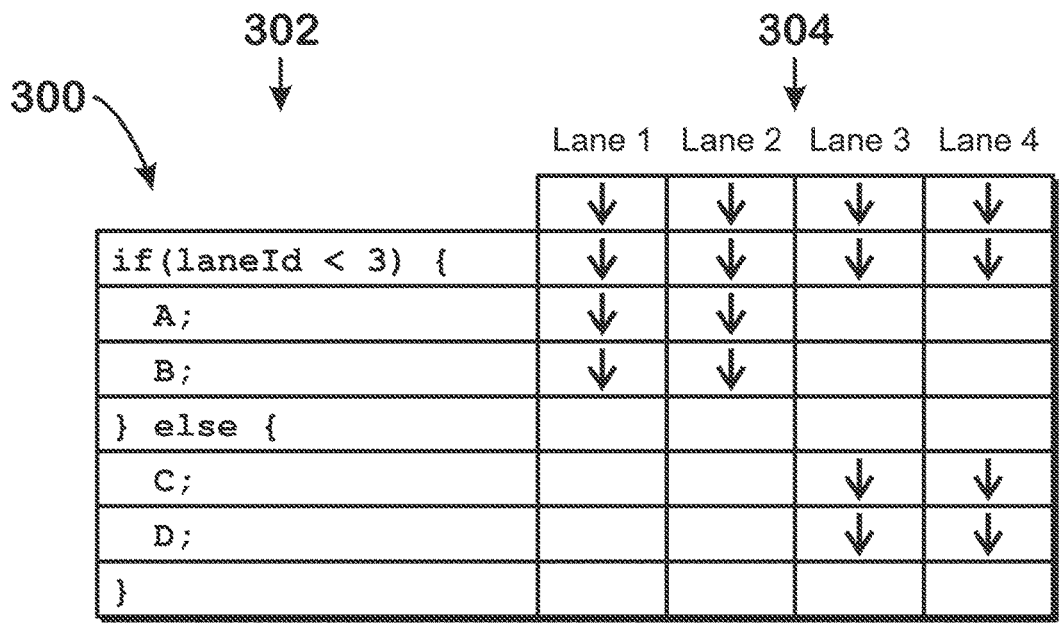
FIG. 3 presents one technique for executing work-items with divergent control flow, according to an example.

FIG. 3 presents one technique for executing work-items with divergent control flow, according to an example. Herein, this technique may be referred to as "waterfalling." A chart 300 illustrates program instructions 302 and lane execution indicators 304 that illustrate the waterfalling technique. The software instructions are illustrated in the C language but it should be understood that a processor would execute machine instructions.

The software instructions include an if statement that evaluates whether the lane ID is less than 3. If the lane ID is less than 3, then statements A; and B; are performed and if the lane ID is not less than 3, then statements C and D are performed. As the execution indicators 304 show, all lanes execute the if statement together. Only lanes 1 and 2 execute statements A; and B; and only lanes 3 and 4 execute C; and D. Because the hardware executes in a SIMD manner, the hardware serializes these two code segments. Specifically, lanes 1 and 2 execute statements A; and B; with lanes 3 and 4 switched off (predication switched on) and then lanes 3 and 4 execute statements C; and D, with lanes 1 and 2 switched off.

Figure 4:
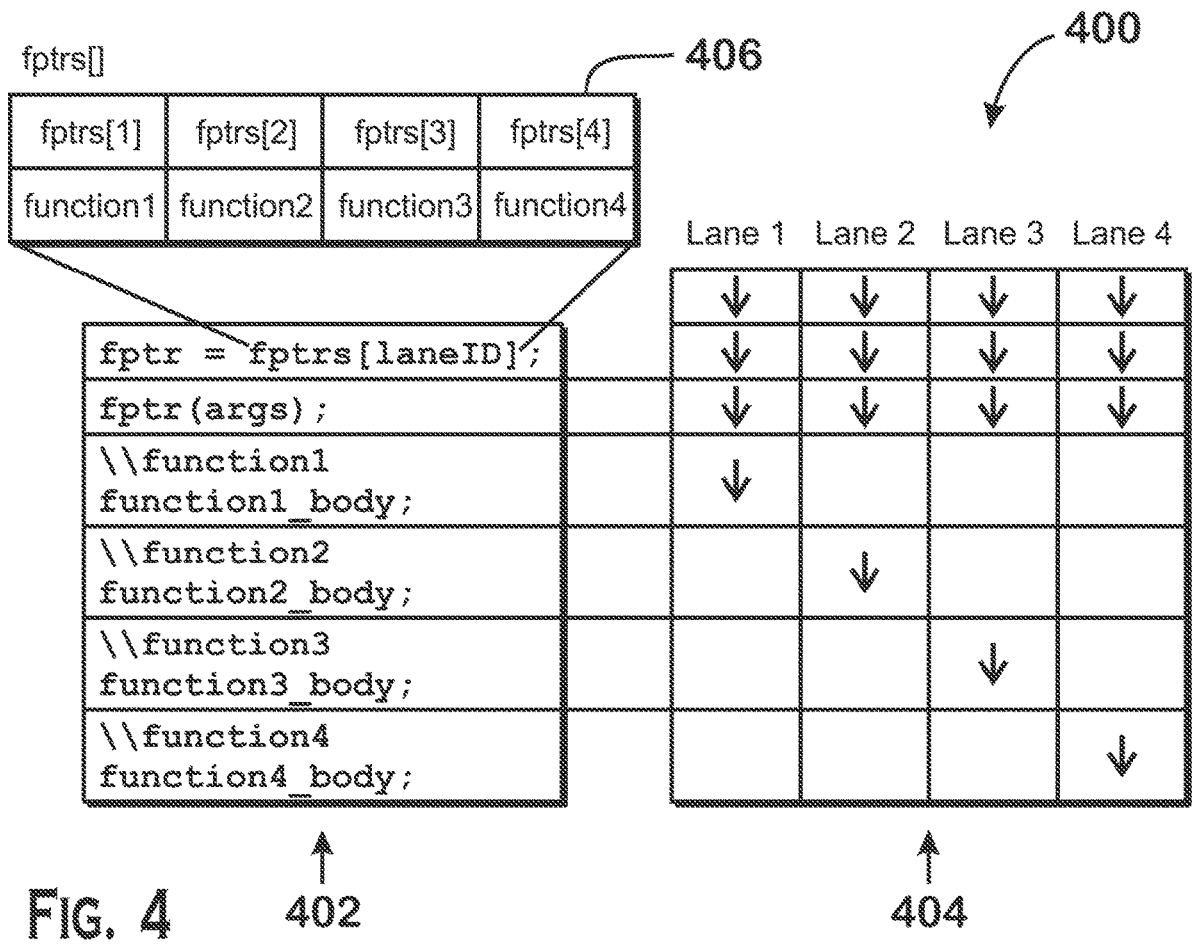
FIG. 4 presents a chart that includes computer code and lane execution indicators, according to an example.

The waterfalling technique may be suitable for a simple case such as a single conditional statement. However, other situations have a greater degree of control flow divergence that may highly serialize work-item execution, which does not take advantage of the inherent parallelism of SIMD execution. FIG. 4 illustrates such an example.

FIG. 4 presents a chart 400 that includes computer code 402 and lane execution indicators 404, according to an example. According to the computer code 402, a function pointer fptr is set to the value stored in the fptrs[ ] function pointer array, indexed by the lane ID. Thus the value fptr is set to a different value for each lane, since each of slots 1-4 of the fptrs[ ] array points to a different function (function1 through function4). When the fptr( ) function is executed, each lane executes its particular function, and thus a different function is executed for each lane. Because the functions are different for each of the lanes, the SIMD execution unit serializes execution of each of the functions. Thus, function 1 is executed for lane 1 with lanes 2-4 switched off, then function 2 is executed for lane 2 with lanes 1 and 3-4 switched off, then function 3 is executed for lane 3 with lanes 1-2 and 4 switched off, and then function 4 is executed for lane 4 with lanes 1-3 switched off. As can be seen, in highly divergent situations, such as when each lane calls a different function, the advantageousness of the parallelism inherent in SIMD execution is greatly reduced.

Figure 5A:
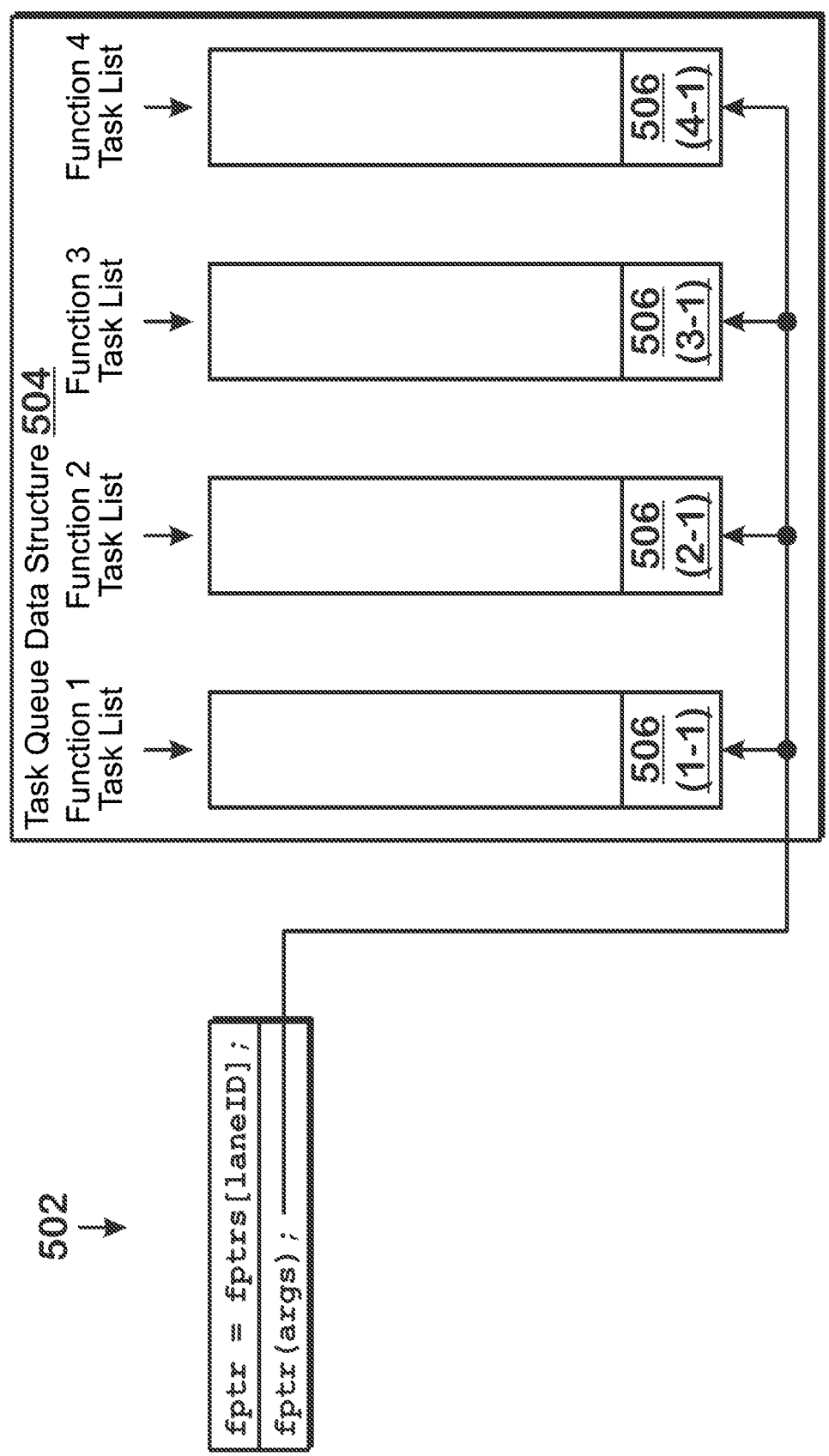
FIGS. 5A-5B and 6 illustrate another technique for executing work-items with divergent control flow, according to an example.
Figure 5B:
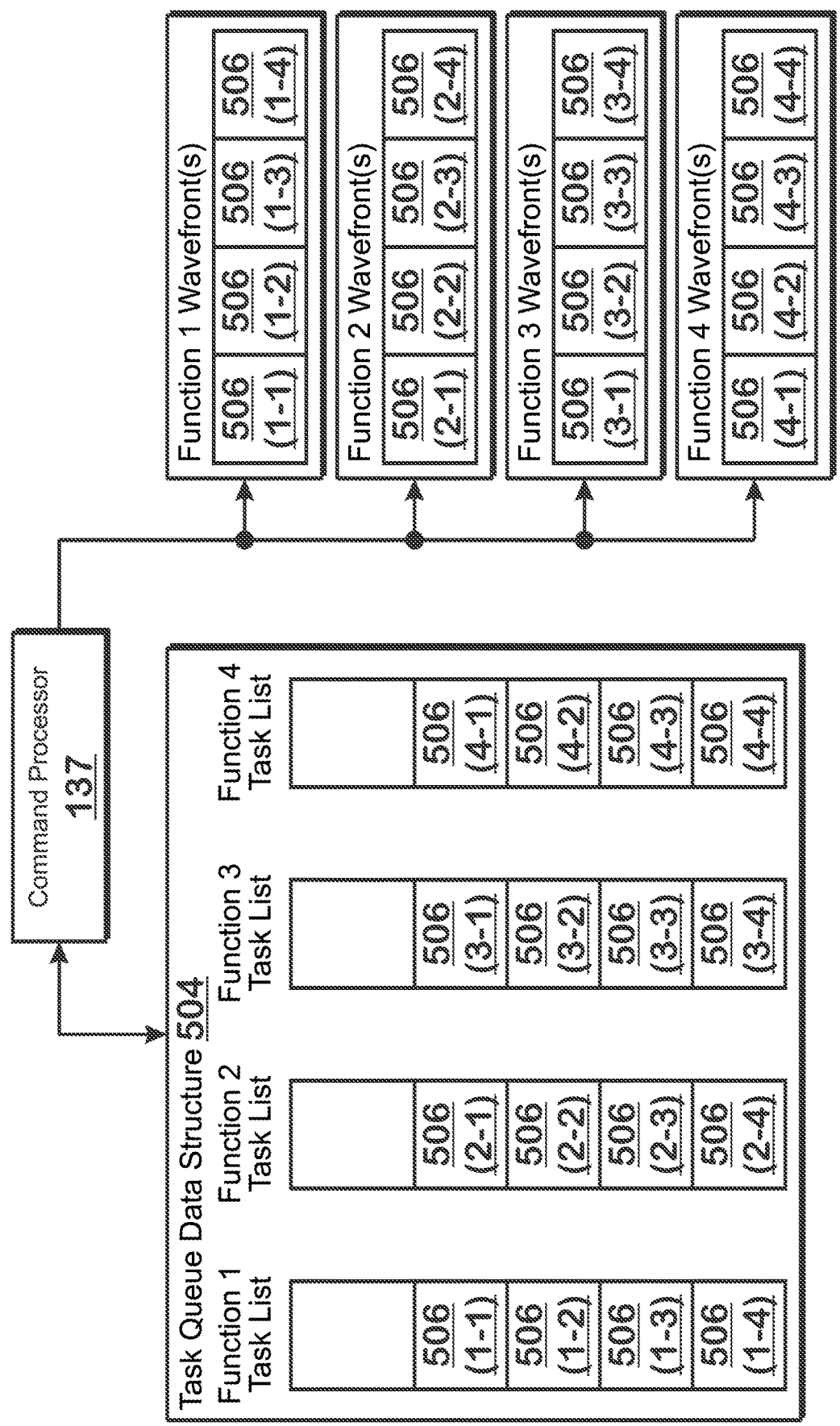
Figure 6:
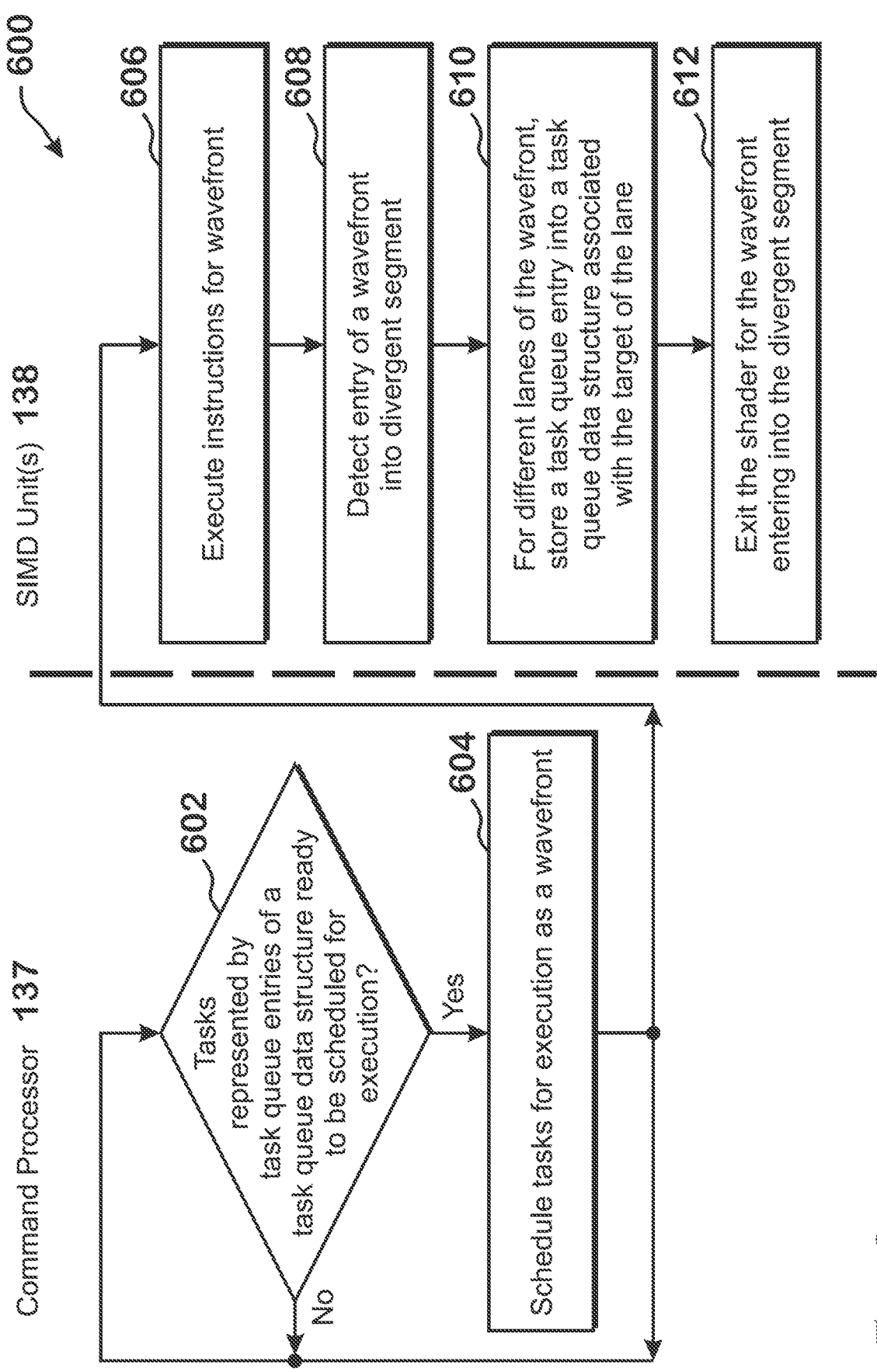

FIGS. 5A-5B and 6 illustrate a different technique for handling divergent control flow. In FIG. 5A, program code 502 is illustrated for causing a function to be executed based on a function pointer. This code is substantially similar to the code of FIG. 4, and includes assignment of a function pointer found in an array (fptrs[ ]) indexed by lane ID to a function pointer variable (fptr) and then execution of the function pointed to by the function pointer variable.

In response to execution of the function, the SIMD unit 138 stores a task queue entry 506 into a task list corresponding to each of the lanes executing the function and exits the shader, the task lists being in a task queue data structure 504. The shader is exited because the subsequent control flow will be handled by the command processor 137 examining task lists and scheduling wavefronts based on those task lists. The purpose of the task list is to allow the command processor 137 to aggregate tasks that can be launched together as a wavefront at a later time, thereby taking advantage of the parallelism of the SIMD architecture. Each task list stores task list entries 506 for execution of a particular task—a portion of code. For example, function 1 task list stores task list entries 506 for execution of function 1, function 2 task list stores task list entries 506 for execution of function 2, and so on. When other wavefronts perform similar operations (including entering into a section of divergent control flow and storing task list entries into task lists), the task lists fill up, as illustrated in FIG. 5B. Once a sufficient number of task entries are stored in any particular task list, the command processor 137 launches a wavefront to execute the segment of code associated with that task list. Thus, instead of serializing different function calls over multiple work-items, the divergent paths of the work-items are grouped together and launched as wavefronts.

Once a particular code segment ends, such as through a call to another function in a divergent manner (e.g., with a function pointer, where the function pointer for multiple different work-items point to different functions), or through a return instruction, the SIMD unit 138 again stores a task list entry in an appropriate task list for later execution and exits the shader. In an example, a wavefront executes with a function pointer call. All of the lanes store a task list entry into an appropriate task list and the wavefront ends execution. At a later time, the command processor 137 causes a wavefront for one of the task lists to execute. That wavefront executes the function and then executes a return instruction. The return instruction causes each of the work-items to store a task list entry into a task list corresponding to the segment of code at the return address of the work-item (note, the return addresses can differ among work-items because the instruction that calls the function could have been executed from different locations in code). At a later time, the command processor 137 examines the task lists associated with the code segment at the return addresses and schedules wavefronts based on those task lists.

It is possible for the APD 116 to handle divergent control flow according to both the waterfall technique of FIG. 3 and according to the technique illustrated in FIGS. 5A-5B (which may be referred to herein as the "adaptive scheduling technique"). More specifically, any particular SIMD unit 138 executing wavefronts would select one or the other technique when control flow is to diverge. The choice of which technique to be used can be made in any technically feasible manner. In one example, shader programs indicate when to use the adaptive scheduling technique explicitly. More specifically, in response to a shader program including an instruction type that explicitly invokes the adaptive scheduling technique, the SIMD unit 138 causes the wavefront to store the task list entries in one or more task lists and to exit. In other examples, SIMD units 138 may determine whether to use the waterfall technique or the adaptive scheduling technique based on runtime characteristics (such as the degree divergence—the number of work-items of a wavefront to flow down different control flow paths), or in any other technically feasible manner.

In some examples, the task list entries store stack pointers for the lane. The stack pointer uniquely identifies the lane for which the task list entry is created. More specifically, each lane has a stack at a location in memory. The stack holds data for the current code segment for the lane, such as local variables, function parameters, and return values. The stack pointer thus uniquely identifies a particular lane. In operation, around the time a lane executes a function call to a function pointer, the lane pushes its register values onto the stack, then pushes function arguments onto the stack. The lane stores the task list entry into an appropriate task list for the function to be called and then exits the shader. When the task corresponding to the task list entry is scheduled for execution, that task executes with the stack pointer of the lane that caused the corresponding task list entry to be placed in the task list. More specifically, that task pops the function arguments off of the stack corresponding to the stack pointer, performs its operations and pushes a return value onto the stack if necessary.

The task list entry generated for a return instruction also includes the stack pointer and results in a task being executed in a similar manner. The task that is executed when the task list entry that is generated as the result of a return instruction pops any return value from the stack and resumes execution.

Each task list is associated with a particular segment of a shader program. This association allows the command processor 137 to group tasks together for execution for the same segment of shader program. Any particular such segment may begin at one of the beginning of a shader program, the beginning of a function, or the return address for a function call. Any particular segment may end at one of the end of a shader program, the end of a function, or the beginning of a function pointer call.

FIG. 6 is a flow diagram of a method 600 for executing divergent shader programs, according to an example. Although described with respect to the system shown and described with respect to FIGS. 1-5B, it should be understood that any system configured to perform the method, in any technically feasible order, falls within the scope of the present disclosure. The method 600 illustrates some steps performed by a command processor 137, which generally include looping through a task list and scheduling wavefronts for execution, as well as some steps performed by one or more SIMD units 138, which generally include execution of the wavefronts, placement of task list entries into task lists, and exiting the shader programs.

The method 600 begins at step 602, where the command processor 137 examines a particular task list to determine whether there are tasks available to be scheduled. Each task represents a work-item that is waiting to be scheduled for a particular segment of a shader program. The command processor 137 may use any technically feasible technique to determine how many tasks to wait for for any particular task list before scheduling such tasks for execution. In one example, the command processor 137 schedules a wavefront for execution of tasks from a task list when there is at least a number of tasks in the task list that is equal to the width of the wavefront, where the term "width" refers to the maximum number of work-items that can be in a wavefront. In this example, the command processor 137 schedules this number of tasks, and not fewer, to maximize the parallelism with which the tasks are executed. In another example, the command processor 137 schedules wavefronts with fewer tasks than the width of the wavefront. The command processor 137 may switch between scheduling wavefronts with this width number of tasks and scheduling wavefronts with less than the width number of tasks as the workload of the SIMD unit 138 increases or decreases. In an example, if the SIMD unit 138 would otherwise be idle, and a task list has fewer than the width number of tasks, the command processor 137 schedules a wavefront with that lower number of tasks to advance execution. Although some example ways of determine when and whether to schedule a wavefront with tasks in a task list for execution are described, any technically feasible technique may be used.

If the command processor 137 does not determine that there are tasks available for scheduling as a wavefront at step 602, then the method 600 loops back around and performs step 602 again. If the command processor 137 does determine that there are available tasks, then the method 600 proceeds to step 604. At step 604, the command processor 137 schedules the tasks for execution as a wavefront. For the command processor 600, after scheduling the wavefront for execution, the method 600 loops back to step 602. On the SIMD unit side 138, at step 606, the SIMD unit 138 executes the wavefront. At step 608, the SIMD unit 138 detects entry of the wavefront into a divergent segment. For any particular wavefront, steps 608-612 are optional because not all wavefronts will enter into a divergent segment. Also, steps 606-612 are not performed only for wavefronts that are scheduled for execution per steps 602-604. In other words, wavefronts generated not based on task entries in task queues may include divergent segments, which would cause execution of steps 606-612 without execution of steps 602-604.

Detecting entry into the divergent segment may occur in any technically feasible manner. Two possibilities include detection of a call to a function using a function pointer and returning from a function that was entered using a function pointer. At step 610, due to entering into the divergent segment, each lane stores a task queue entry into a task queue data structure that is associated with the target—the code segment—of the lane. For instance, if one lane calls a function pointer that points to function1( ), then that lane stores a task queue entry into the task queue list associated with function1( ). If another lane calls a function pointer that points to function2( ), then that lane stores a task queue entry into the task queue list associated with function2( ), and so on. In some examples, the task queue entry includes the stack pointer associated with the lane. At step 612, the SIMD unit 138 exits the shader for the wavefront that is entering into the divergent segment. After this, at some point, the command processor 137 schedules the tasks for execution in their own wavefronts.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving execution of a shader program, having divergent control flow, the method comprising:
   as a result of calling a function pointer having a target function that differs for two or more work-items of a first wavefront of the shader program, detecting entry of the first wavefront into a divergent section, wherein, in the divergent section, a first set of one or more work-items is slated to execute a first function and additional work-items are slated to execute a second function different from the first function;

selecting a plurality of work-items that target the first function for execution as a second wavefront, wherein the plurality of work-items include work-items from the first wavefront and one or more work-items from an additional wavefront; and executing the second wavefront.

2. The method of claim 1, further comprising:
exiting the shader program at the divergent section.

3. The method of claim 1, further comprising:
storing one or more task list entries, comprising, for each lane for which entry into the divergent section is detected, generating a task list entry that identifies the lane and storing the generated task list entry into a task list associated with the target of the lane in the divergent section.

4. The method of claim 3, wherein:
the task list entry identifies the lane by including a stack pointer associated with the lane.

5. The method of claim 4, wherein the stack pointer points to a stack associated with the lane that stores one or more of function parameters, return values, and register values.

6. The method of claim 3, further comprising:
storing one or more additional task list entries into a plurality of task lists that includes one or more task lists corresponding to the first function, wherein each task list of the plurality of task lists is associated with a different target of a function pointer call.

7. The method of claim 6, further comprising:
executing a third wavefront using task list entries from the plurality of task lists that correspond to the second function.

8. A compute unit comprising:
a command processor; and
a processing unit configured to execute a shader program having divergent control flow,
wherein the command processor is configured to:
as a result of calling a function pointer having a target function that differs for two or more work-items of a first wavefront of the shader program, detect entry of the first wavefront into a divergent section, wherein, in the divergent section, a first set of one or more work-items is slated to execute a first function and additional work-items are slated to execute a second function different from the first function;
selecting a plurality of work-items that target the first function for execution as a second wavefront, wherein the plurality of work-items include work-items from the first wavefront and one or more work-items from an additional wavefront; and
executing the second wavefront.

9. The compute unit of claim 8, wherein the processing unit is further configured to:
exit the shader program at the divergent section.

10. The compute unit of claim 8, wherein:
the command processor is configured to store one or more task list entries by, for each lane for which entry into the divergent section is detected, generating a task list entry that identifies the lane and storing the generated task list entry into a task list associated with the target of the lane in the divergent section.

11. The compute unit of claim 10, wherein:
the task list entry identifies the lane by including a stack pointer associated with the lane.

12. The compute unit of claim 11, wherein the stack pointer points to a stack associated with the lane that stores one or more of function parameters, return values, and register values.

13. The compute unit of claim 10, wherein the command processor is further configured to:
store one or more additional task list entries into a plurality of task lists that includes the one or more task lists corresponding to the first function, wherein each task list of the plurality of task lists is associated with a different target of a function pointer call.

14. The compute unit of claim 13, wherein the command processor is configured to:
execute a third wavefront using task list entries from the plurality of task lists that correspond to the second function.

15. An accelerated processing device comprising:
a plurality of compute units, each comprising a processor, configured to execute shader programs, wherein at least one of the compute units is configured to execute a shader program having divergent control flow by:
as a result of calling a function pointer having a target function that differs for two or more work-items of a first wavefront of the shader program, detecting entry of the first wavefront into a divergent section, wherein, in the divergent section, a first set of one or more work-items is slated to execute a first function and additional work-items are slated to execute a second function different from the first function;
selecting a plurality of work-items that target the first function for execution as a second wavefront, wherein the plurality of work-items include work-items from the first wavefront and one or more work-items from an additional wavefront; and
executing the second wavefront.

16. The accelerated processing device of claim 15, wherein the at least one of the compute unit comprising the processor is configured to exit the shader program at the divergent section.

17. The accelerated processing device of claim 15, wherein the at least one of the compute units is further configured to:
store one or more task list entries, comprising, for each lane for which entry into the divergent section is detected, generating a task list entry that identifies the lane and storing the generated task list entry into a task list associated with the target of the lane in the divergent section.

18. The accelerated processing device of claim 17, wherein:
the task list entry identifies the lane by including a stack pointer associated with the lane.

19. The accelerated processing device of claim 18, wherein the stack pointer points to a stack associated with the lane that stores one or more of function parameters, return values, and register values.

20. The accelerated processing device of claim 15, further comprising:
storing one or more additional task list entries into a plurality of task lists that includes the one or more task lists corresponding to the first function, wherein each task list of the plurality of task lists is associated with a different target of a function pointer call.

* * * * *